US007010734B2

(12) United States Patent
Brahme et al.

(10) Patent No.: US 7,010,734 B2
(45) Date of Patent: Mar. 7, 2006

(54) METHOD FOR MICROPROCESSOR TEST INSERTION REDUCTION

(75) Inventors: Upendra S. Brahme, Fremont, CA (US); Donald E. Fox, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 465 days.

(21) Appl. No.: 10/277,555

(22) Filed: Oct. 21, 2002

(65) Prior Publication Data

US 2004/0078677 A1 Apr. 22, 2004

(51) Int. Cl.
*G01R 31/28* (2006.01)

(52) U.S. Cl. .................................... 714/724; 714/37

(58) Field of Classification Search ............... 714/739, 714/724, 37, 718; 438/14; 717/137; 324/763; 702/120

See application file for complete search history.

(56) References Cited

U.S. PATENT DOCUMENTS 5,485,471 A * 1/1996 Bershteyn ................... 714/739
5,726,996 A * 3/1998 Chakradhar et al. ........ 714/724
6,154,715 A * 11/2000 Dinteman et al. .......... 702/120
6,167,545 A * 12/2000 Statovici et al. ............ 714/724
6,377,979 B1 * 4/2002 Yamashita et al. .......... 709/213
6,682,947 B1 * 1/2004 Madge ........................ 438/14
6,760,904 B1 * 7/2004 Jennion et al. ............. 717/137
6,812,724 B1 * 11/2004 Rao et al. .................. 324/763

* cited by examiner

*Primary Examiner*—David Ton
(74) *Attorney, Agent, or Firm*—Gunnison, McKay & Hodgson, L.L.P.; Lisa A. Norris

(57) ABSTRACT

Methods for reducing the requirement for multiple test vector sub-set insertions of a test vector set on test equipment having a limited memory size. In one embodiment, a single, selective test vector sub-set is utilized in the pre-burn-in test phase of microprocessors and multiple test vector sub-set insertions of a test vector set are utilized in the post-burn-in test phase. In one embodiment, the single, selective test vector sub-set includes selected test vectors from some or all of the test vector sub-sets used in the post-burn-in test phase and is sized to fit within the fixed memory capacity of the test equipment. In another embodiment, a single, selective test vector sub-set is utilized in both the pre-burn and post-burn test phases.

11 Claims, 8 Drawing Sheets

METHOD FOR MICROPROCESSOR TEST INSERTION REDUCTION

BACKGROUND OF THE INVENTION

1. Field of the Invention

The present invention relates generally to microprocessors, and more particularly to methods for testing microprocessors.

2. Description of Related Art

A large majority of digital products, such as computers, utilize one or more microprocessors that implement and manage the functions of the product. Currently, many companies that provide digital equipment to the consumer marketplace, often outsource the fabrication of the microprocessors to one or more suppliers specializing in production of the microprocessors.

It is important to catch defects in the microprocessor device early in the fabrication stage while costs associated with the defect are lower than in later stages. Once the microprocessor is further assembled at later stages into larger components, such as circuit boards, failure of the microprocessor can result in substantial cost escalation, such as costs to rework a circuit board. If the microprocessor fails when assembled in the final product, the costs can be even greater and the marketplace reputation of the company can be affected.

To ensure end reliability of the final product, the outsourcing company typically requires the supplier to test each microprocessor utilizing specialized test equipment to ensure the microprocessor meets a required standard of quality assurance and reliability. As a microprocessor can contain hundreds of thousands of gates and functionalities, the outsourcing company's engineering group typically generates a large amount of test patterns, also termed test vectors, to ensure the test equipment adequately tests each gate and functionality requirement of the microprocessor. Thus, the resulting test vector set can be very large.

In many instances, the memory space required to run the complete test vector set is larger in size than the test equipment memory capacity. When this occurs, the test package is truncated into multiple, smaller segments, termed test vector sub-sets, which are incrementally loaded into the test equipment memory to accommodate the limited test equipment memory size. Multiple insertions, or loads, of the test vector sub-sets significantly add to microprocessor production costs paid by the outsourcing supplier, and are an inefficient use of the microprocessor supplier's production cycles.

FIG. 1 illustrates a block diagram of a microprocessor test process having multiple pre-burn-in and post-burn-in test vector sub-set insertions found in the prior art. In the present example, the microprocessor test process 100 includes three phases: a pre-burn-in test phase 102, a burn-in phase 104, and a post-burn-in test phase 106. Due to the limited memory capacity of the test equipment used in test process 100, the complete test vector set is truncated into three segments, test vector sub-set 1 (TVSS 1), test vector sub-set 2 (TVSS 2), and test vector sub-set 3 (TVSS 3).

After microprocessor fabrication, such as on a wafer, wafer sort and assembly, a supplier initiates pre-burn-in testing of the microprocessors. In pre-burn-in test phase 102, at process 108, the supplier loads test vector sub-set 1 into the memory of the test equipment. At process 110, the test equipment executes test vector sub-set 1 in testing the microprocessors. When test vector sub-set 1 testing is complete, at process 112, test vector sub-set 2 is loaded into memory, and, at process 114, the test equipment executes test vector sub-set 2. When test vector sub-set 2 testing is complete, at process 116, test vector sub-set 3 is loaded into memory and, at process 118, the test equipment executes test vector sub-set 3. Thus, three insertions, or loads, into test equipment memory, were needed to run the complete test vector set during pre-burn-in test phase 102. When pre-burn-in test phase 102 is complete, burn-in phase 104 begins, during which, at process 120, the microprocessors are burned in. Burn-in is a process where the field life expectancy is re-created in a shorter amount of time by operating the microprocessor at higher voltage and temperature to accelerate the early life fails termed infant mortality.

Following burn-in phase 104, post-burn-in test phase 106 begins, during which the supplier essentially repeats the tests used in pre-burn-in test phase 102. At process 122, test vector sub-set 1 is loaded into the memory of the test equipment, and, at process 124, the test equipment executes test vector sub-set 1. At process 126, test vector sub-set 2 is loaded into memory, and, at process 128, test vector sub-set 2 is executed. At process 130, test vector sub-set 3 is loaded into memory, and, at process 132, test vector sub-set 3 is executed. After test process 100 is complete, the approved microprocessors can be further processed, such as by the addition of latch attachments and packaging for shipment.

As described above, test process 100 requires six test vector sub-set insertions, e.g., processes 108, 112, 116, 122, 126 and 130, in order for a complete test vector set to be executed in the pre-burn-in test phase 102 and in the post-burn-in test phase 106. Due to the typically large size of each test vector sub-set, the load time of each test vector sub-set into the test equipment memory can take hours, and this load time is in addition to the time spent actually testing the microprocessors, e.g., executing each test vector sub-set. This procedure can be expensive as the supplier typically charges the outsourcing company for time spent loading each test vector sub-set plus a per test insertion charge. Further, the testing equipment throughput of the supplier goes down, as the supplier's production shift spends significant time waiting for the test equipment memory to be loaded rather than actively testing microprocessors. Thus output efficiency of the test equipment is reduced and the price per unit produced increases substantially.

SUMMARY OF THE INVENTION

According to the principles of the present invention, there are provided methods for reducing the requirement for multiple test vector sub-set insertions of a test vector set on test equipment having a limited memory size.

According to one embodiment, a method for testing one or more microprocessors for defects on test equipment having a fixed memory capacity includes: loading a single, selective test vector sub-set into a fixed memory of test equipment, the selective test vector sub-set further comprising one or more selected test vectors, the selective test vector sub-set being less than or equal to the memory capacity of the test equipment; executing the selective test vector sub-set on the test equipment prior to burning in the one or more microprocessors, execution of the selective test vector sub-set causing the test equipment to test the microprocessors with the one or more selected test vectors; executing a burn-in of the one or more microprocessors; after burning in the one or more microprocessors, loading a first test vector sub-set into the fixed memory of the test equipment, the first test vector sub-set being one segment of a test vector set, the first test vector sub-set further comprising a first sub-set of test vectors; after loading the first test vector sub-set, executing the first test vector sub-set on the test equipment, execution of the first test vector sub-set causing the test equipment to test the one or more microprocessors with the first sub-set of test vectors; after executing the first test vector sub-set, loading a second test vector sub-set into the fixed memory of the test equipment, the second test vector sub-set being another segment of the test vector set, the second test vector sub-set further comprising a second sub-set of test vectors; and after loading the second test vector sub-set, executing the second test vector sub-set on the test equipment, execution of the second test vector sub-set causing the test equipment to test the one or more microprocessors with the second sub-set of test vectors.

In some embodiments the method further includes: after executing the second test vector sub-set on the test equipment, loading a third test vector sub-set into the fixed memory of the test equipment, the third test vector sub-set being a further segment of the test vector set, the third test vector sub-set further comprising a third sub-set of test vectors; and after loading the third test vector sub-set, executing the third test vector sub-set on the test equipment, execution of the second test vector sub-set causing the test equipment to test the one or more microprocessors with the third sub-set of test vectors.

According to another embodiment, a method for testing one or more microprocessors for defects on test equipment having a fixed memory capacity includes: loading a single, selective test vector sub-set into a fixed memory of test equipment, the selective test vector sub-set further comprising one or more selected test vectors, the selective test vector sub-set being less than or equal to the memory capacity of the test equipment; executing the selective test vector sub-set on the test equipment prior to burning in the one or more microprocessors, execution of the selective test vector sub-set causing the test equipment to test the microprocessors with the one or more selected test vectors; executing a burn-in of the one or more microprocessors; loading the single, selective test vector sub-set into the fixed memory of the test equipment; and executing the selective test vector sub-set on the test equipment after burning in the one or more microprocessors, execution of the selective test vector sub-set causing the test equipment to test the microprocessors with the one or more selected test vectors.

According to a further embodiment, a selective test vector sub-set for testing one or more microprocessors on test equipment having a fixed memory capacity includes one or more selected test vectors.

In some embodiments, the selected test vector sub-set is used for testing one or more microprocessors prior to burn-in of the one or more microprocessors. In some embodiments, the selected test vector sub-set is used for testing the one or more microprocessors prior to and after burn-in of the one or more microprocessors. In some embodiments, the selected test vectors are selected from one or more test vector sub-sets used in testing the one or more microprocessors after burn-in. In some embodiments, the selected test vectors are selected from a test vector set. In some embodiments, the selected test vectors are selected based upon the statistical relevance of a selected test vector to past defects found in the microprocessors and the memory size of the test equipment.

BRIEF DESCRIPTION OF THE DRAWINGS

The accompanying drawings, which are incorporated in, and constitute a part of this specification illustrate embodiments of the present invention, and together with the description, serve to explain the principles of the invention.

In the drawings.

DETAILED DESCRIPTION

The invention will now be described in reference to the accompanying drawings. The same reference numbers may be used throughout the drawings and the following description to refer to the same or like structure.

According to the present invention, there are provided methods for reducing the requirement for multiple test vector sub-set insertions of a test vector set on test equipment having a limited memory size. In one embodiment, the present invention utilizes a single, selective test vector sub-set in the pre-burn-in test phase and multiple test vector sub-set insertions in the post-burn-in test phase. The single, selective test vector sub-set includes selected test vectors from some or all of the test vector sub-sets used in the post-burn-in test phase and is sized to fit within the fixed memory capacity of the test equipment. In another embodiment, the present invention utilizes a single, selective test vector sub-set in the pre-burn-in test phase and a reduced number of test vector sub-set insertions in the post-burn-in test phase. In a further embodiment, the present invention utilizes a single, selective test vector sub-set in both the pre-burn and post-burn test phases. The present invention can thus reduce production costs with little or no impact on the reliability and quality of a tested microprocessor device.

Figure 2:
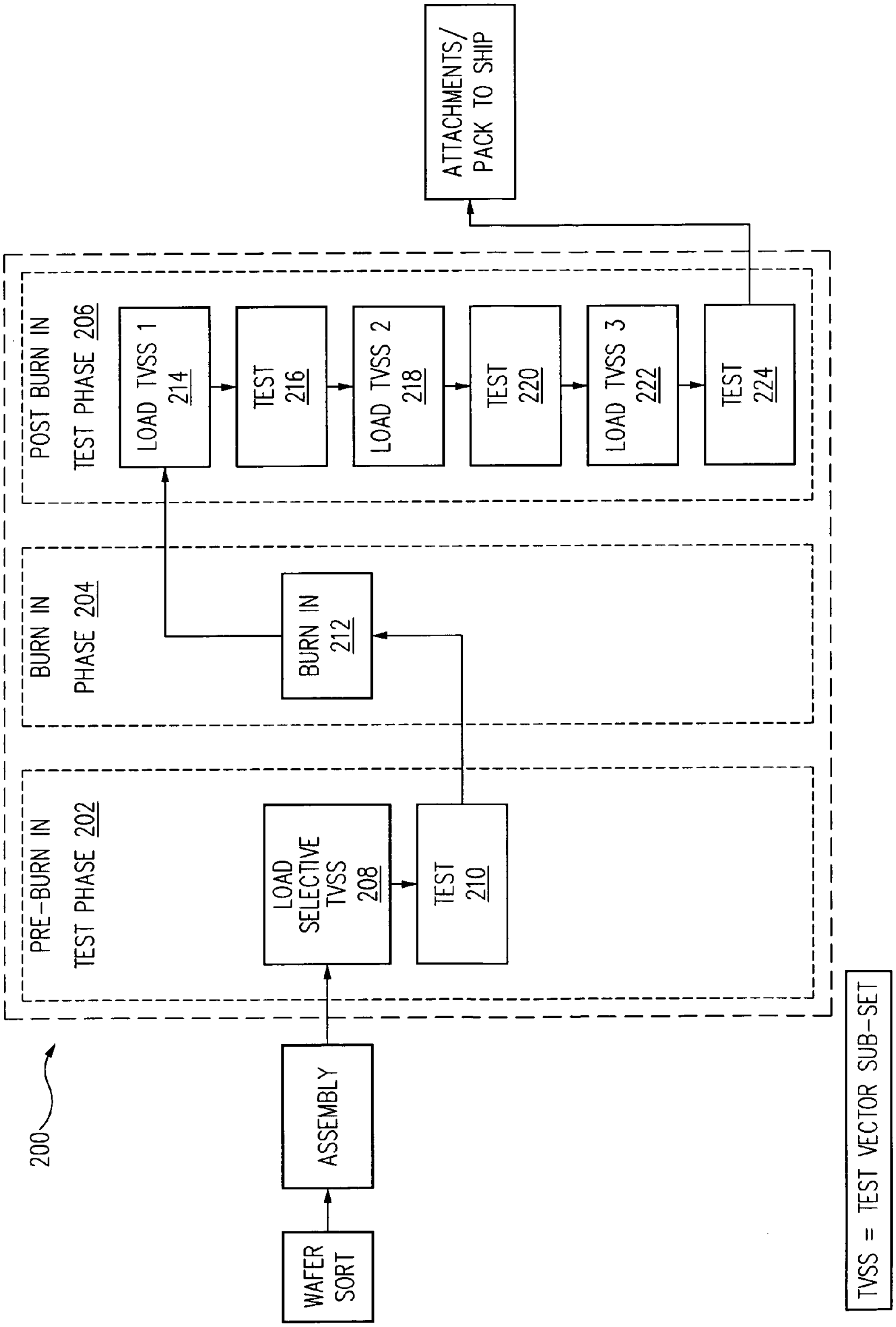
FIG. 2 illustrates a high level block diagram of a microprocessor test process utilizing a single, selective test vector sub-set in the pre-burn-in test phase and multiple test vector sub-set insertions in the post-burn-in test phase according to one embodiment of the present invention.
Figure 3:
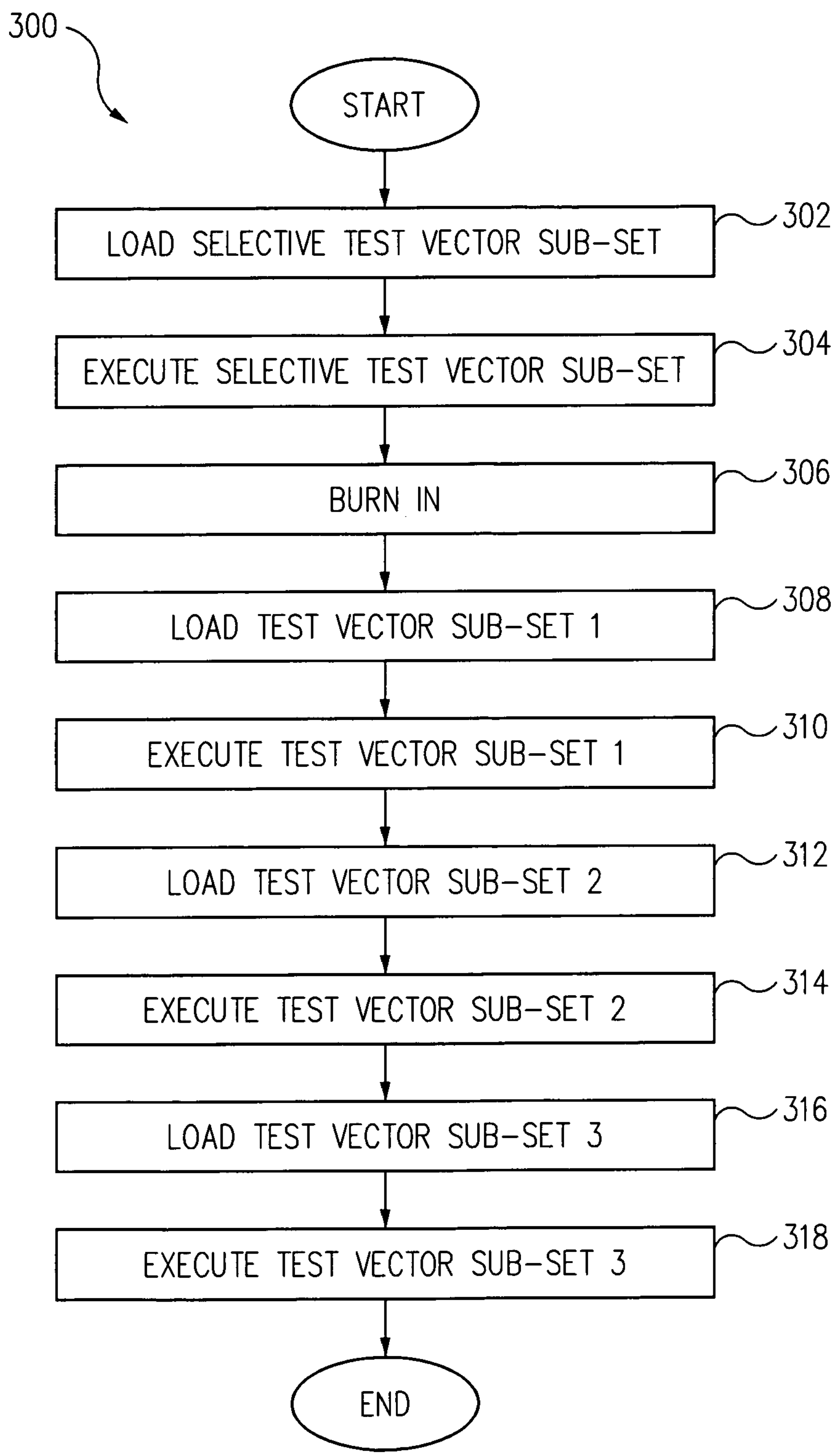
FIG. 3 illustrates a process flow diagram of a method for implementing test process 200 of FIG. 2 according to one embodiment of the present invention.
Figure 4:
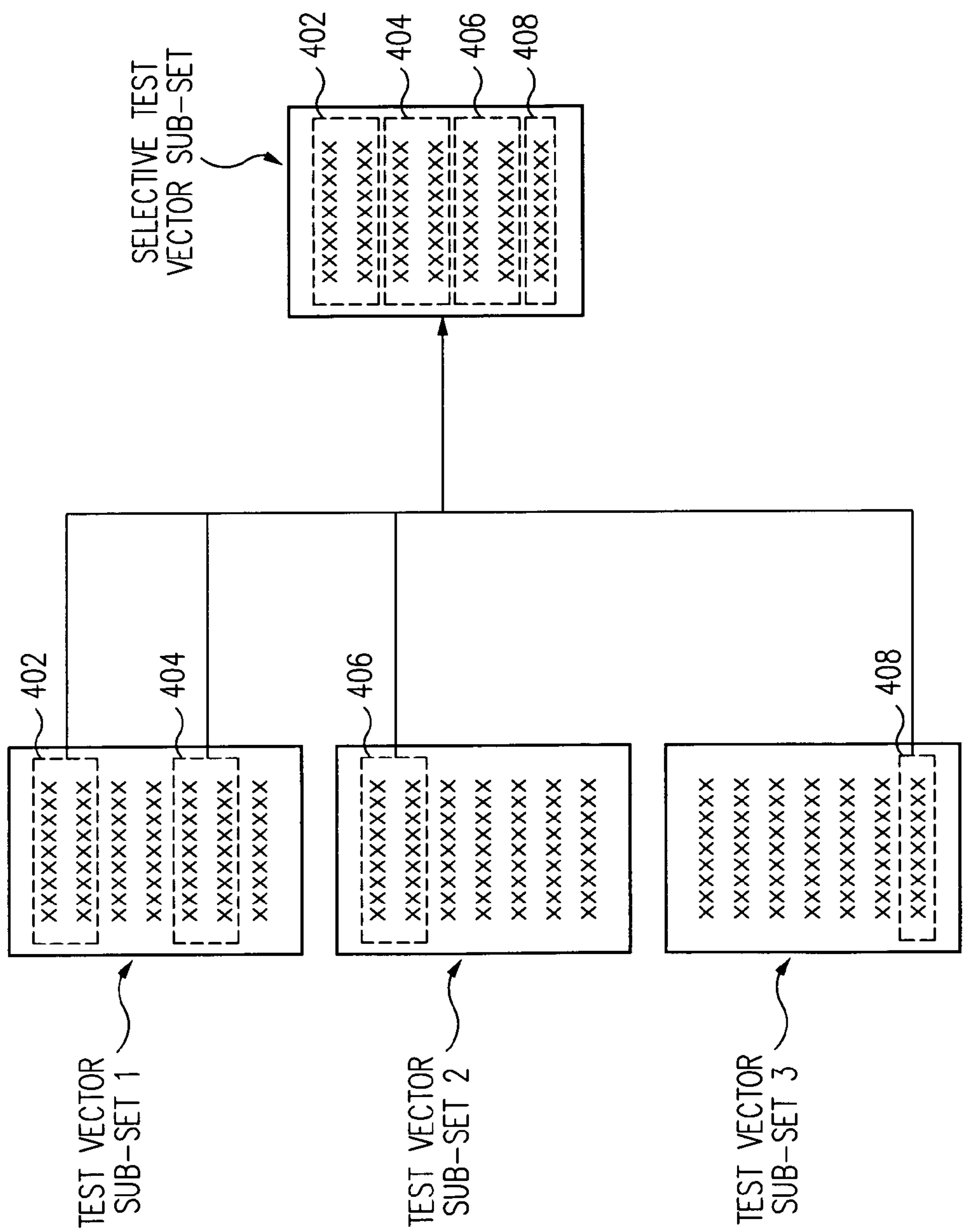
FIG. 4 illustrates a high level diagram of the construction of a selective test vector sub-set according to one embodiment of the present invention.

FIGS. 2, 3 and 4 are now referred to in describing a first embodiment of the invention in which a single, selective test vector sub-set is utilized in the pre-burn-in test phase and multiple test vector sub-set insertions are utilized in the post-burn-in test phase. FIG. 2 presents a block diagram of the process, while FIG. 3 presents a process flow diagram of the method, and FIG. 4 provides an example of the construction of a selective test vector sub-set. It can be appreciated that while FIGS. 2, 3, and 4 as well as FIGS. 5, 6, 7, and 8 describe or reference a particular number of test vector sub-sets that make up a complete test vector set, the present invention is also applicable to test processes that have fewer or more test vector sub-sets, and the present examples are not intended to be limiting of the invention.

Figure 1:
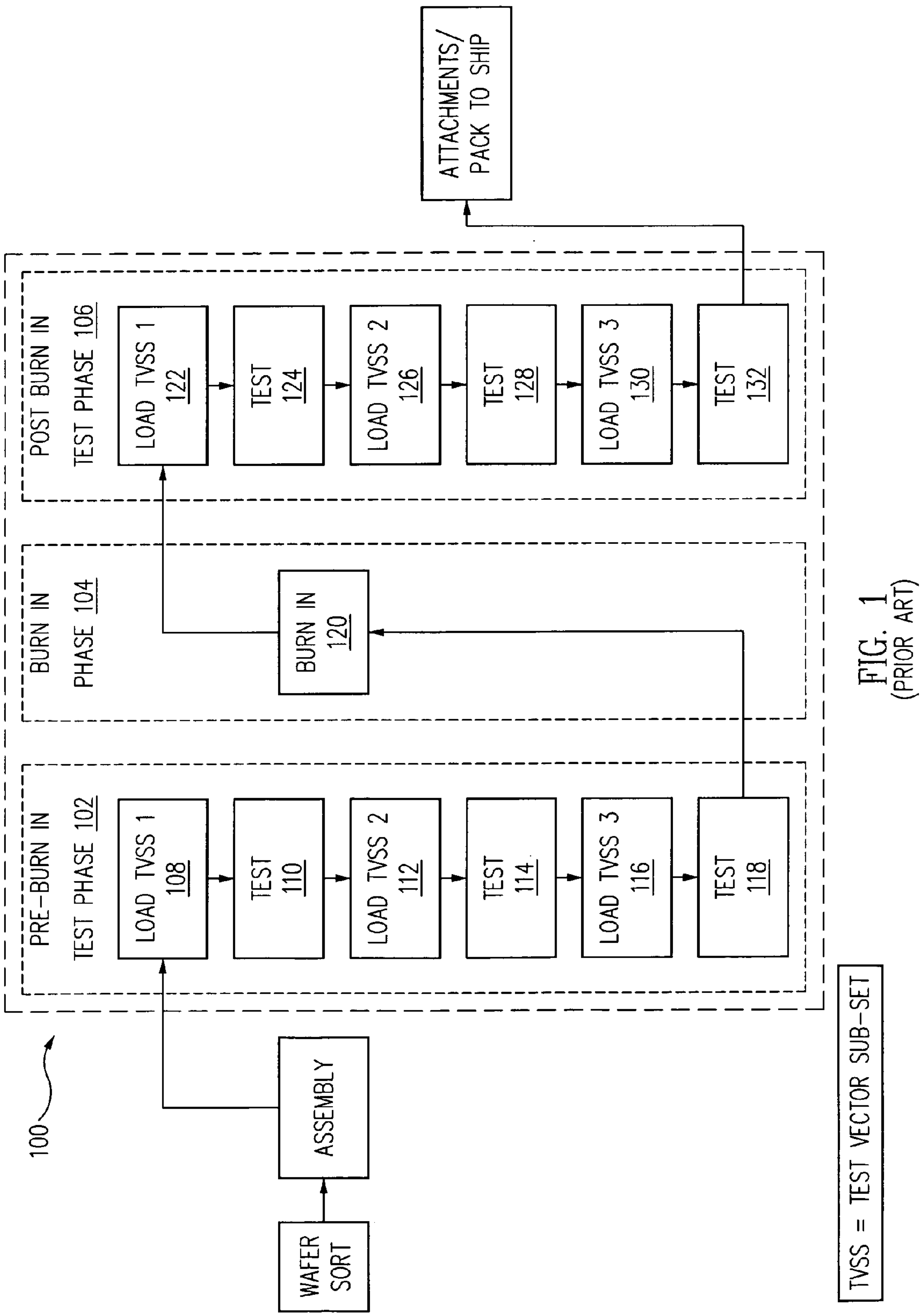
FIG. 1 illustrates a block diagram of a microprocessor test process having multiple pre-burn-in and post-burn-in test vector sub-set insertions found in the prior art.

FIG. 2 illustrates a high level block diagram of a microprocessor test process utilizing a single, selective test vector sub-set in the pre-burn-in test phase and multiple test vector sub-set insertions in the post-burn-in test phase according to one embodiment of the present invention. In FIG. 2, in one embodiment, after wafer processing and assembly, groups of microprocessor devices are tested utilizing test process 200. Test process 200 includes a pre-burn-in test phase 202, a burn-in phase 204, and a post-burn-in test phase 206. In test process 200, pre-burn-in test phase 202 utilizes a selective test vector sub-set which is a selected sub-set of test vectors from some or all of test vector sub-sets 1, 2 and 3 used in post-burn-in test phase 106 and is sized to fit within the memory capacity of the test equipment. Post-burn-in test phase 206 utilizes multiple test vector sub-sets 1, 2, and 3 that represent segments of a complete test vector set. Thus, when compared with prior art test process 100 described with reference to FIG. 1, test process 200 of FIG. 2 requires only one test insertion in the pre-burn-in test phase, rather than three, thus reducing the overall testing insertions from six, in the prior art, to four.

FIG. 3 illustrates a process flow diagram of a method for implementing test process 200 of FIG. 2 according to one embodiment of the present invention. According to method 300, in one embodiment, at operation 302, a selective test vector sub-set is loaded into test equipment for testing one or more microprocessor devices. Referring to FIG. 2, at process 208, the selective test vector sub-set is loaded into the memory of the test equipment. In one embodiment, the selective test vector sub-set includes test vectors statistically selected from some or all of test vector sub-sets 1, 2, and 3 used in post-burn-in test phase 206 that meet particular reliability and quality assurance parameters required of the microprocessor and that fit within the test equipment memory size without requiring additional insertions.

In one embodiment, the selected test vector sub-set is statistically arrived at based upon the feedback data from the manufacturing process including test data, such as frequency of failures. In one embodiment, the failures are statistically analyzed to determine what test vectors represent the most significant and repeatable errors seen in the product across the manufacturing process. Those test vectors that detected errors above a specified threshold and that fit within the memory size of the test equipment are selected for inclusion in the selected test vector sub-set. -In other embodiments, data used to select test vectors for inclusion in the selective test vector sub-set can also come from other sources, such as later stage testing data and/or consumer feedback. In some instances, these data can be used to correct defects in the design of the microprocessor or in the manufacturing process. FIG. 4 illustrates an example of the construction of a selective test vector sub-set.

FIG. 4 illustrates a high level diagram of the construction of a selective test vector sub-set according to one embodiment of the present invention. In FIG. 4, test vector sub-sets 1, 2, and 3 comprise a complete test vector set for a microprocessor. Test vectors 402 and 404 of test vector sub-set 1, test vector 406 of test vector sub-set 2, and test vector 408 of test vector sub-set 3 are selected for inclusion in the selected test vector sub-set, as described above, and fit within the memory capacity of the test equipment without requiring further insertions. This is but one example for illustrative purposes, and as described,above, the selected test vectors can be selected from some or all of the test vector sub-sets used in the post-burn-in test phase, e.g., test vector sub-sets 1, 2, and 3.

Referring back to FIG. 3, at operation 304, the selective test vector sub-set is executed by the test equipment, and the microprocessors are tested. Returning to FIG. 2, at process 210, the microprocessors are tested using the selective test vector sub-set.

Returning to FIG. 3, after testing with the selective test vector sub-set, at operation 306, the microprocessors are burned in. Referring to FIG. 2, after pre-burn-in test phase 202, the microprocessors enter burn-in phase 204, and, at process 210, are burned in.

Returning to FIG. 3, after burn-in, at operation 308, test vector sub-set 1 is loaded into the test equipment memory and at operation 314 test vector sub-set 1 is executed to test the microprocessors. Referring to FIG. 2, after burn-in phase 204, the microprocessors enter post-burn-in test phase 206. At process 214, test vector sub-set 1 is loaded into memory, and, at process 216, the microprocessors are tested using test vector sub-set 1.

Returning to FIG. 3, at operation 312, test vector sub-set 2 is loaded into the test equipment memory, and at operation 314, test vector sub-set 2 is executed to test the microprocessors. Referring to FIG. 2, at process 218, test vector sub-set 2 is loaded into memory, and, at process 220, the microprocessors are tested using test vector sub-set 2.

Returning to FIG. 3, at operation 316, test vector sub-set 3 is loaded into the test equipment memory, and at operation 318, test vector sub-set 3 is executed to test the microprocessors. Referring to FIG. 2, at process 222, test vector sub-set 3 is loaded into memory, and, at process 224, the microprocessors are tested using test vector sub-set 2.

Thus, post-burn-in test phase 206 utilizes a complete test vector set, e.g., by insertions of test vector sub-sets 1, 2, and 3. Post-burn-in test phase 206 includes all of the test vectors in the selective test vector sub-set used during pre-burn-in test phase 202, as well as those test vectors that did not meet the statistical/memory threshold for inclusion in the selected test vector sub-set.

This embodiment reduces test insertions during the pre-burn-in test phase 202 by utilizing a single, selective pre-burn-in test vector sub-set composed of selected test vectors from some or all of the test vector sub-sets utilized in post-burn-in test phase 206 and that fit within the test equipment memory size.

In some test vector sets, it can be the case that one of the test vector sub-sets is composed entirely of test vectors that detect statistically negligible defects in the microprocessors, e.g., the microprocessors tend to not have defects in these test areas. In this case, as further described with reference to FIGS. 5 and 6, the particular test vector sub-set can be eliminated from the post-burn-in test phase and the selective test vector sub-set contains test vectors selected from the remaining test vector sub-sets.

Figure 5:
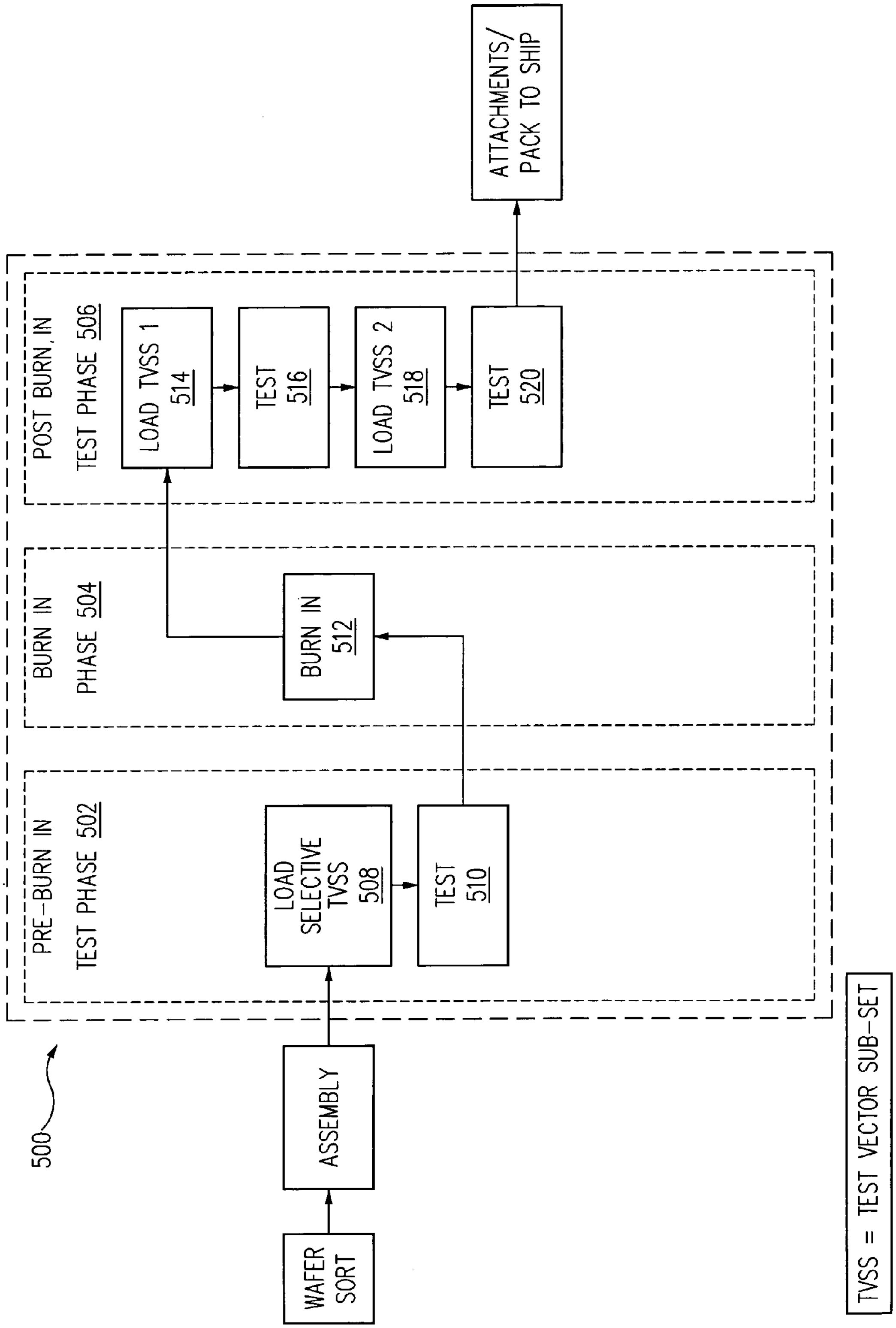
FIG. 5 illustrates a high level block diagram of a microprocessor test process utilizing a single, selective test vector sub-set in the pre-burn-in test phase and a reduced number of test vector sub-set insertions in the post-burn-in test phase according to another embodiment of the present invention.

FIG. 5 illustrates a high level block diagram of a microprocessor test process utilizing a single, selective test vector sub-set in the pre-burn-in test phase and a reduced number of test vector sub-set insertions in the post-burn-in test phase according to another embodiment of the present invention. Test process 500 includes a pre-burn-in test phase 502, a burn-in phase 504, and a post-burn-in test phase 506. In test process 500, pre-burn-in test phase 502 utilizes a selective test vector sub-set which includes test vectors from some or all of test vector sub-sets 1 and 2 used in post-burn-in test phase 506 and is sized to fit within the memory capacity of the test equipment. Post-burn-in test phase 506 utilizes test vector sub-sets that include at least some test vectors that statistically detect some defects found in the microprocessors above a pre-defined threshold. Thus, in the example illustrated in FIG. 5, if the complete test vector set had included a test vector sub-set 3 that was composed of test vectors that showed statistically negligible or no defects in the microprocessor, test vector sub-set 3 is eliminated from post-burn-in test phase 506.

Thus, this embodiment reduces test insertions during the pre-burn-in phase by utilizing a single, selective test vector sub-set composed of selected test vectors from some or all of the post-burn-in test vector sub-sets and that fits within the test equipment memory size, and in the post-burn-in testing phase by utilizing a reduced number of test vector sub-sets.

Figure 6:
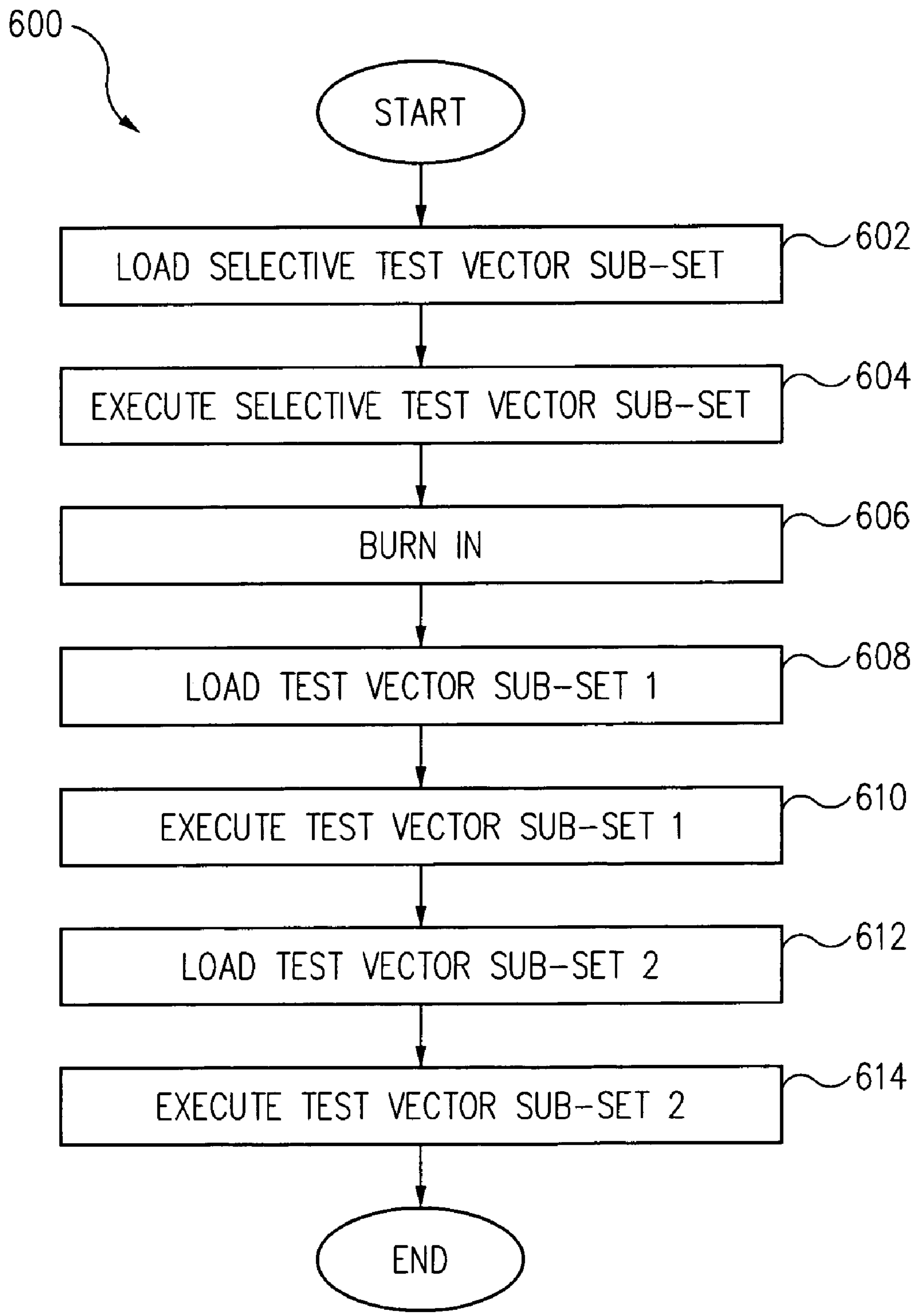
FIG. 6 illustrates a process flow diagram of a method for implementing test process 500 of FIG. 5 according to one embodiment of the present invention.

FIG. 6 illustrates a process flow diagram of a method for implementing test process 500 of FIG. 5 according to one embodiment of the present invention. According to method 600, in one embodiment, at operation 602, a selective test vector sub-set is loaded into test equipment for testing one or more microprocessor devices. Referring to FIG. 5, at process 508, the selective test vector sub-set is loaded into the memory of the test equipment. In one embodiment, the selective test vector sub-set includes test vectors statistically selected from some or all of test vector sub-sets 1 and 2 used in post-burn-in test phase 506 that meet particular reliability and quality assurance parameters required of the microprocessor and that fit within the test equipment memory size without requiring additional insertions. In one embodiment, the selected test vector sub-set is statistically arrived at as earlier described with reference to FIGS. 2, 3, and 4, hereby incorporated by reference.

Referring back to FIG. 6, at operation 604, the selective test vector sub-set is executed by the test equipment, and the microprocessors are tested. Returning to FIG. 5, at process 510, the microprocessors are tested using the selective test vector sub-set.

Returning to FIG. 6, after testing with the selective test vector sub-set, at operation 606, the microprocessors are burned in. Referring to FIG. 5, after pre-burn-in test phase 502, the microprocessors enter burn-in phase 504 and, at process 512, are burned in.

Returning to FIG. 6, after burn-in, at operation 608, test vector sub-set 1 is loaded into the test equipment memory and, at operation 610, test vector sub-set 1 is executed to test the microprocessors. Referring to FIG. 5, after burn-in phase 504, the microprocessors enter post-burn-in test phase 506. At process 514, test vector sub-set 1 is loaded into memory, and, at process 516, the microprocessors are tested using test vector sub-set 1.

Returning to FIG. 6, at operation 612, test vector sub-set 2 is loaded into the test equipment memory, and at operation 614, test vector sub-set 2 is executed to test the microprocessors. Referring to FIG. 5, at process 518, test vector sub-set 2 is loaded into memory, and, at process 520, the microprocessors are tested using test vector sub-set 2.

Post-burn-in test phase 506 utilizes test vector sub-sets 1 and 2, and has eliminated test vector sub-set 3. Thus, the post-burn-in test phase 506 includes all of the test vectors in the selective test vector sub-set used during pre-burn-in test phase 502, as well as those test vectors in test vector sub-sets 1 and 2 that did not meet the statistical/memory threshold for inclusion in the selected test vector set. Thus, according to this embodiment of the invention, the number of test insertions is reduced during the pre-burn-in test phase 502 by utilizing a single, selective pre-burn-in test vector sub-set composed of selected test patterns from some or all of test vector sub-sets utilized in post-burn-in test phase 506, e.g., test vector sub-sets 1 and 2, that fit within the test equipment memory size.

In another embodiment of the present invention, only the selective test vector sub-set is utilized in both the pre-burn-in and post-burn-in test phases.

Figure 7:
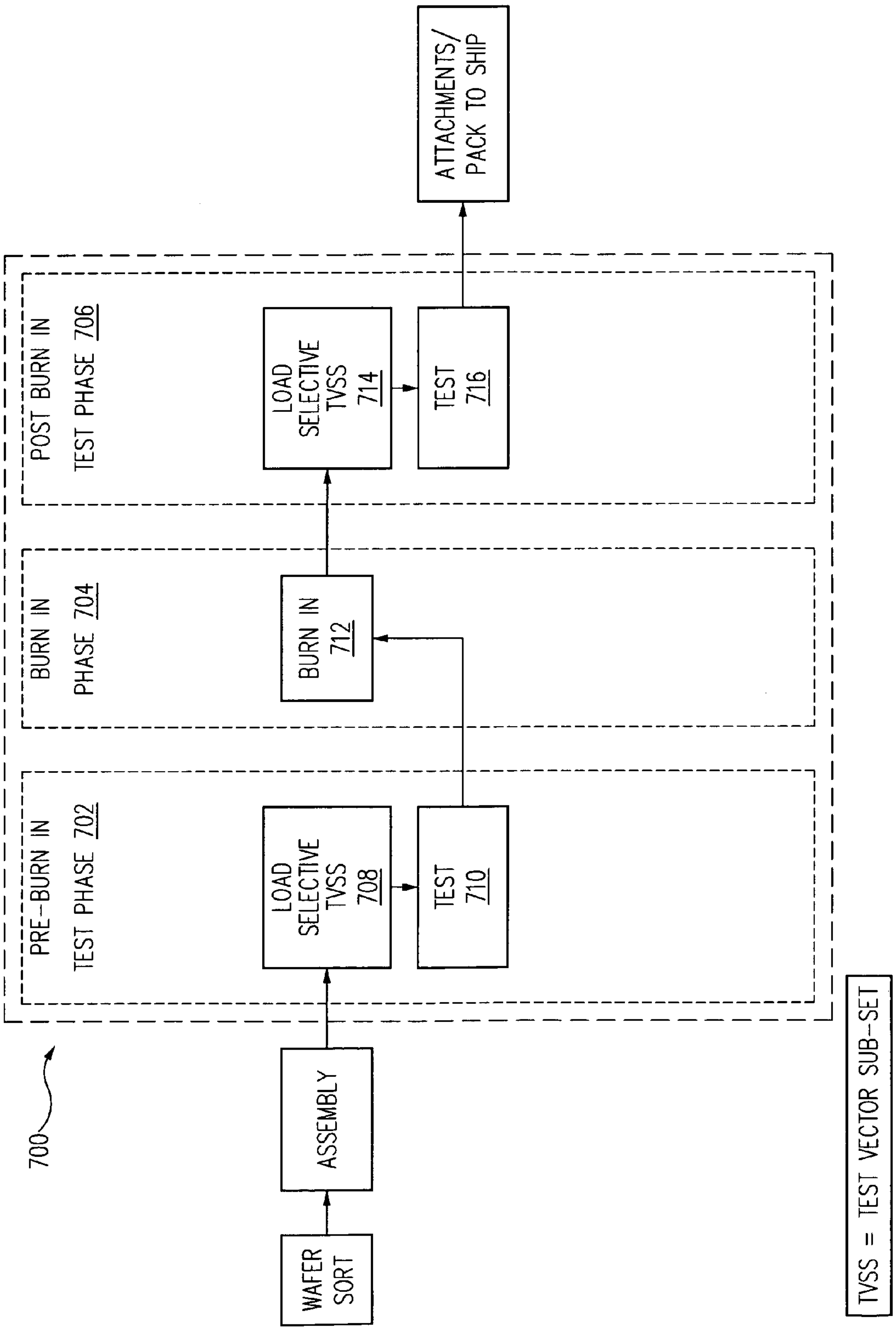
FIG. 7 illustrates a high level block diagram of a microprocessor test process utilizing a single, selective test vector sub-set in both the pre-burn-in and post-burn-in test phases according to one embodiment of the present invention.

FIG. 7 illustrates a high level block diagram of a microprocessor test process utilizing a single, selective test vector sub-set in both the pre-burn-in and post-burn-in test phases according to one embodiment of the present invention.

According to process 700, in one embodiment, a selective test vector sub-set is utilized for testing microprocessors in both pre-burn-in test phase 702 and post-burn-in test phase 706. Thus, only a single test insertion is required in pre-burn-in test phase 702 and post-burn-in test phase 706.

Figure 8:
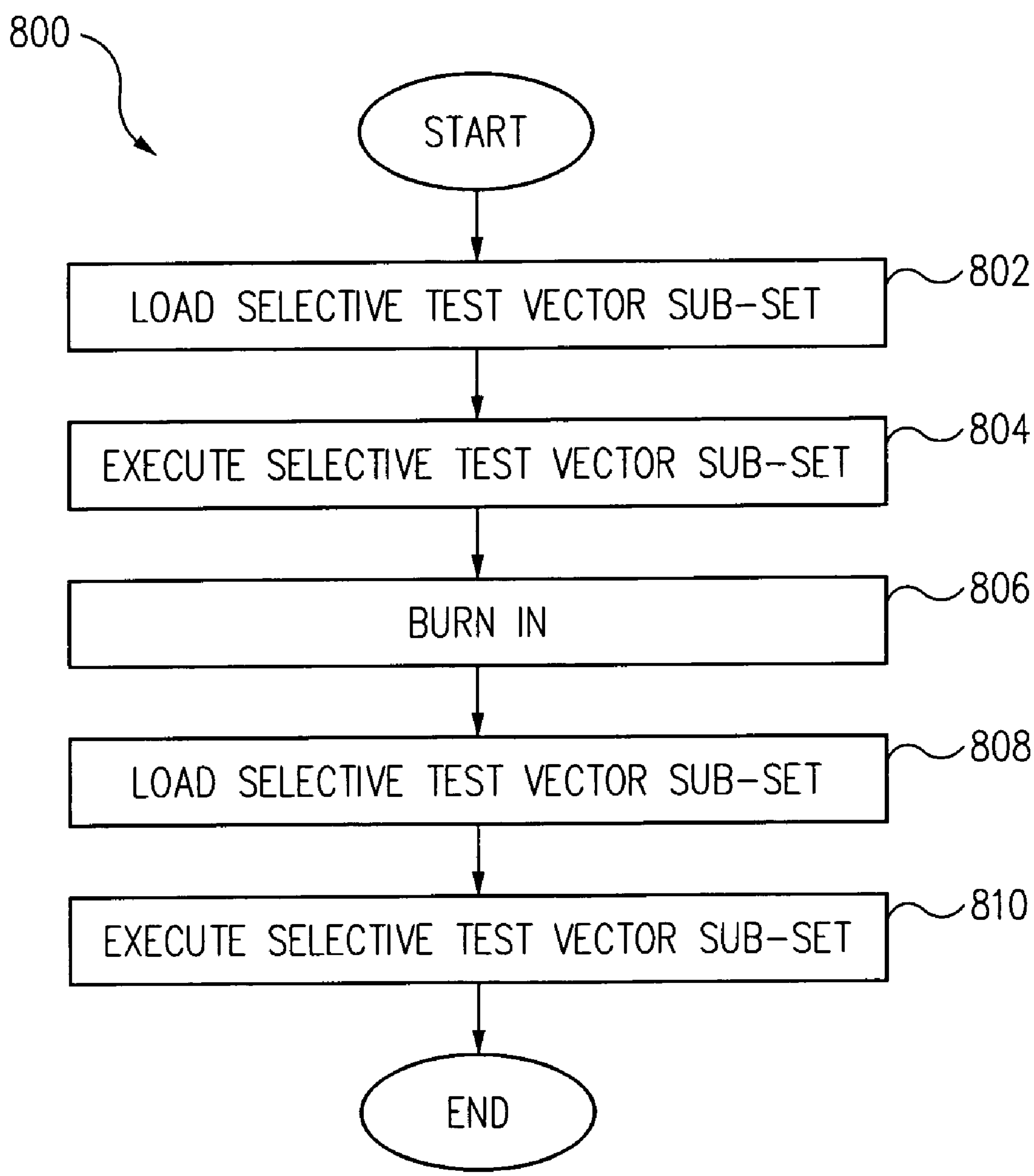
FIG. 8 illustrates a process flow diagram of a method for implementing test process 700 of FIG. 7 according to one embodiment of the present invention.

FIG. 8 illustrates a process flow diagram of a method for implementing process 700 of FIG. 7 according to one embodiment of the present invention. According to method 800, in one embodiment, at operation 802, a selective test vector sub-set is loaded into test equipment for testing one or more microprocessor devices. Referring to FIG. 7, at process 702, the selective test vector sub-set is loaded into the memory of the test equipment. In one embodiment, the selected test vector sub-set includes test vectors statistically selected to meet particular reliability and quality assurance parameters required of the microprocessor and that fit within the test equipment memory size without requiring additional test vector set insertions. In one embodiment, these selected test vectors can be selected from a complete test vector set, while in another embodiment the selected test vectors can be developed from data received from the manufacturing process, as earlier described with reference to FIGS. 2, 3, and 4. Although in this embodiment the selective test vector sub-set is titled a "sub-set", it can be appreciated that when developed from data sources without the benefit of an earlier created test vector set, it may not in actuality be a sub-set.

Referring back to FIG. 8, at operation 804, the selective test vector sub-set is executed by the test equipment, and the microprocessors are tested. Returning to FIG. 7, at process 710, the microprocessors are tested using the selective test vector sub-set.

Returning to FIG. 8, after testing with the selective test vector sub-set, at operation 806, the microprocessors are burned in. Referring to FIG. 7, after pre-burn-in test phase 702, the microprocessors enter burn-in phase 704 and, at process 712, are burned in.

Returning to FIG. 8, after burn-in, at operation 808, the selective test vector sub-set is loaded into the test equipment memory, and, at operation 810, the selective test vector sub-set is executed to test the microprocessors. Referring to FIG. 7, after burn-in phase 704, the microprocessors enter post-burn-in test phase 706. At process 714, the selective test vector sub-set is loaded into memory, and, at process 716, the microprocessors are tested using the selective test vector sub-set.

This embodiment further reduces test insertions during a testing process by utilizing a single, selective test vector sub-set composed of selected test vectors that fit within the test equipment memory size, for both the pre-burn-in test phase and the post-burn-in test phase.

As a result of these and other features discussed in more detail above, the present invention provides methods for reducing the requirement for multiple test vector sub-set insertions of a test vector set on test equipment having a limited memory size when compared to the prior art technique. Consequently, microprocessors tested according to the principles of the present invention can have reduced production costs with little to no impact on the reliability and quality of the tested microprocessor.

The foregoing descriptions of implementations of the present invention have been presented for purposes of illustration and description, and therefore are not exhaustive and do not limit the invention to the precise forms disclosed. Modifications and variations are possible in light of the above teachings or can be acquired from practicing the invention. In particular it can be appreciated by those of skill in the art that while the present invention is described with reference to microprocessor testing, the principles can also be applied to other devices that utilize multiple insertions of truncated test segments. Consequently, the scope of the invention is defined by the claims and their equivalents.

What is claimed is:

1. A method for testing one or more microprocessors for defects on test equipment having a fixed memory capacity, the method comprising:

loading a single, selective test vector sub-set into a fixed memory of test equipment, the selective test vector sub-set further comprising one or more selected test vectors, the selective test vector sub-set being less than or equal to the memory capacity of the test equipment;

executing the selective test vector sub-set on the test equipment prior to burning in the one or more microprocessors, execution of the selective test vector sub-set causing the test equipment to test the microprocessors with the one or more selected test vectors;

executing a burn-in of the one or more microprocessors;

after burning in the one or more microprocessors, loading a first test vector sub-set into the fixed memory of the test equipment, the first test vector sub-set being one segment of a test vector set, the first test vector sub-set further comprising a first sub-set of test vectors;

executing the first test vector sub-set on the test equipment, execution of the first test vector sub-set causing the test equipment to test the one or more microprocessors with the first sub-set of test vectors;

loading a second test vector sub-set into the fixed memory of the test equipment, the second test vector sub-set being another segment of the test vector set, the second test vector sub-set further comprising a second sub-set of test vectors; and executing the second test vector sub-set on the test equipment, execution of the second test vector sub-set causing the test equipment to test the one or more microprocessors with the second sub-set of test vectors.

2. The method of claim 1, further comprising:

after executing the second test vector sub-set on the test equipment, loading a third test vector sub-set into the fixed memory of the test equipment, the third test vector sub-set being a further segment of the test vector set, the third test vector sub-set further comprising a third sub-set of test vectors; and executing the third test vector sub-set on the test equipment, execution of the second test vector sub-set causing the test equipment to test the one or more microprocessors with the third sub-set of test vectors.

3. The method of claim 2, wherein the selected test vectors are selected from some or all of the first, second and third test vector sub-sets.

4. The method of claim 1, wherein the selected test vectors are statistically selected.

5. The method of claim 1, wherein the selected test vectors are test vectors that detect errors above a specified statistical frequency threshold and that fit within the memory size of the test equipment.

6. The method of claim 1, wherein the selected test vectors are selected from some or both of the first and second test vector sub-sets.

7. The method of claim 1, wherein the selected test vectors are selected from the test vector set.

8. A method for testing one or more microprocessors for defects on test equipment having a fixed memory capacity, the method comprising:

loading a single, selective test vector sub-set into a fixed memory of test equipment, the selective test vector sub-set further comprising one or more selected test vectors, the selective test vector sub-set being less than or equal to the memory capacity of the test equipment;

executing the selective test vector sub-set on the test equipment prior to burning in the one or more microprocessors, execution of the selective test vector sub-set causing the test equipment to test the microprocessors with the one or more selected test vectors;

executing a burn-in of the one or more microprocessors;

loading the single, selective test vector subset into the fixed memory of the test equipment; and executing the selective test vector sub-set on the test equipment after burning in the one or more microprocessors, execution of the selective test vector sub-set causing the test equipment to test the microprocessors with the one or more selected test vectors.

9. The method of claim 8, wherein the selected test vectors are statistically selected.

10. The method of claim 9, wherein the selected test vectors are test vectors that detect errors above a specified statistical frequency threshold and that fit within the memory size of the test equipment.

11. The method of claim 8, wherein the selected test vectors are selected from a test vector set.

* * * * *

UNITED STATES PATENT AND TRADEMARK OFFICE

CERTIFICATE OF CORRECTION

PATENT NO. : 7,010,734 B2
APPLICATION NO. : 10/277555
DATED : March 7, 2006
INVENTOR(S) : Upendra S. Brahme and Donald E. Fox It is certified that error appears in the above-identified patent and that said Letters Patent is hereby corrected as shown below:

Column 3
At line 23, after “of the”, change “second” to read -- third --.

Column 6
At line 34, after “sub-set”, change “2” to read -- 3 --.

Column 10
At line 5, after “of the”, change “second” to read -- third --.

Signed and Sealed this

Eighteenth Day of September, 2007

JON W. DUDAS
*Director of the United States Patent and Trademark Office*